(12) United States Patent
Markley

(10) Patent No.: US 6,358,169 B1
(45) Date of Patent: Mar. 19, 2002

(54) CHAIN TENSIONER SYSTEM HAVING A PIVOTING TENSIONER ARM

(75) Inventor: George L. Markley, Montour Falls, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/562,210

(22) Filed: May 2, 2000

(51) Int. Cl.$^7$ .............................. F16H 7/08; F16H 7/18
(52) U.S. Cl. ...................................... 474/111; 474/140
(58) Field of Search .................... 474/110, 111, 474/109, 112, 140, 135, 133, 138

(56) References Cited

U.S. PATENT DOCUMENTS

| | | | |
|---|---|---|---|
| 2,210,276 A | * 8/1940 | Bremer | 74/242.11 |
| 3,811,332 A | * 5/1974 | Brown et al. | 74/242.11 S |
| 3,964,331 A | 6/1976 | Olfield | 74/242.1 |
| 4,177,689 A | * 12/1979 | Zeilinger et al. | 74/242.8 |
| 5,318,482 A | 6/1994 | Sato et al. | 474/111 |
| 5,597,367 A | 1/1997 | Trzmiel et al. | 474/110 |
| 5,702,318 A | 12/1997 | Hayafune et al. | 474/111 |
| 5,776,024 A | 7/1998 | White et al. | 474/110 |
| 5,797,817 A | 8/1998 | Senftleben et al. | 474/110 |
| 5,967,922 A | * 10/1999 | Ullein et al. | 474/111 |

FOREIGN PATENT DOCUMENTS

| GB | 861741 | 2/1961 |
|---|---|---|

* cited by examiner

*Primary Examiner*—David A. Bucci
*Assistant Examiner*—Timothy McAnulty
(74) *Attorney, Agent, or Firm*—Sidley Austin Brown & Wood; Greg Dziegielewski

(57) ABSTRACT

An engine tensioning system including a pivoting tensioner arm used to simultaneously tension two separate strands of the same chain in an engine timing system. The tensioner arm includes an body with essentially an "I" shape with upper and lower extending legs with attached shoes. In the center of the body a pivot bore and pivot pin allows the body to rotate. At least one pair of shoes are attached to the body by way of tabs extending in a perpendicular direction from the legs. The body rotates causing the shoes to contact and impart tension to the separate strands of the chain simultaneously and act to dampen vibrations in one strand of chain by transferring the energy through the body to the other shoe and strand.

5 Claims, 3 Drawing Sheets

CHAIN TENSIONER SYSTEM HAVING A PIVOTING TENSIONER ARM

BACKGROUND OF THE INVENTION

The present invention relates generally to tensioners used with chain drives in automotive timing and power transmission applications. In particular, the present invention is related to a hydraulic chain tensioner system having a pivoting tensioner arm which acts to simultaneously tension two strands of a chain in an engine timing application.

Chain tensioning devices, such as hydraulic tensioners, are used as control devices for power transmission chains as the chain travels between a plurality of sprockets. In an automotive application, the tension of the chain can vary greatly due to the wide variation in the temperature and the linear expansion among the various parts of the engine. Moreover, wear to the chain components during prolonged use can produce a decrease in the tension of the chain. As a result, it is important to impart and maintain a certain degree of tension to the chain to prevent noise, slippage, or unmeshing of the chain with the sprocket teeth. It is especially important in the case of a chain-driven camshaft in an internal combustion engine to prevent the chain from slipping because the camshaft timing can be misaligned by several degrees, possibly rendering the engine inoperative or causing damage.

A hydraulic tensioner as used with a tensioner arm or shoe is shown in Simpson et al., U.S. Pat. No. 5,967,921, which is incorporated herein by reference. Hydraulic chain tensioners typically have a plunger slidably fitted into a chamber and biased outward by a spring to provide tension to the chain. A lever, arm or shoe is often used at the end of the plunger to assist in the tensioning of the chain. The hydraulic pressure from an external source, such as an oil pump or the like, flows into the chamber through passages formed in the housing. The plunger is moved outward against the arm by the combined efforts of the hydraulic pressure and the spring force.

When the plunger tends to move in a reverse direction (inward) away from the chain, typically a check valve is provided to restrict the flow of fluid from the chamber. In such a fashion, the tensioner achieves a so-called no-return function, i.e., movements of the plunger are easy in one direction (outward) but difficult in the reverse direction. In addition, rack and ratchet mechanisms, which are well known in the art are employed to provide a mechanical no-return function.

One example of a chain tensioner which uses a hydraulic tensioner and a pivoted lever to tension a chain is described in Sato et al., U.S. Pat. No. 5,318,482. Sato et al. show a conventional hydraulic tensioner with a plunger pressing a pivoted lever against a chain to impart an appropriate tension to the chain. The tensioner and single shoe arm of Sato et al. has limitations, however, in the amount of chain slack it can take up during the life of the chain. In addition, the single shoe arm of Sato et al. has limitations in its ability to absorb and damp cyclic vibrations in the chain during operation.

Conventional prior art tensioners which tension only one strand of chain, i.e., a single length of chain between two sprockets, in an engine timing application with long center distances between the sprockets have a common weakness. During operation of the engine, wear on the various chain parts causes the chain to lengthen. Taking up the resulting slack on one side of an engine timing system and not the other can cause the timing of the camshaft to change relative to the crankshaft. In some engine timing chain applications, the large center distances cause both sides of the chain span between sprockets to slacken as the chain wears and extends in length.

To address the above conventional problems the present invention includes an actuator in the form of a conventional hydraulic tensioner in combination with a pivoting tensioner arm. The tensioner arm may include either two shoes or two pair of shoes. In combination, the shoes operate on separate strands of a common chain. This potentially provides approximately double the operating take-up for a given range of tensioner operation as compared to a conventional hydraulic tensioner acting upon a single arm with an end pivot that acts on one chain strand. When used to tension separate strands of a single chain, vibrations which occur in one strand of chain tend to be cancelled when the energy of those vibrations are transferred to or combined with those in another strand through the pivoting tensioner. Further, when taking up chain slack in an engine timing application, the present invention minimizes the chance for changes in the timing between the crankshaft and the camshaft as the chain wears and slackens on both sides of the chain span between the sprockets.

SUMMARY OF THE INVENTION

The present invention provides a chain tensioner system including an actuator, which may be a conventional hydraulic tensioner, in conjunction with a pivoting tensioner arm assembly that contacts both lengths or strands of the span of chain between a pair of sprockets.

The chain tensioner system of the present invention includes a hydraulic actuator as described above and a pivoting tensioner arm. The tensioner arm is located between a pair of rotating sprockets which are drivingly interconnected by a chain. The chain has at least two separate strands, spans or lengths that are the portions extending between the sprockets. The portion between the sprockets where the chain leaves the cam sprocket and enters the crankshaft sprocket is typically the tight side as a result of the tension imposed on the chain to drive the camshaft sprocket. The portion between the sprockets where the chain leaves the crankshaft sprocket and enters the camshaft sprocket is typically the slack side of the chain on account of the absence of driving of the camshaft along that strand. However, in systems with large center distances between the sprockets, both sides evidence some slack.

The tensioner arm includes a bracket or a main body portion which is shaped essentially like an "I" in which both ends have been flattened. Near the center of the body is a pivot bore. The pivot bore is a hole with a cylindrical sleeve or bushing through which a pivot pin, shaft or bolt is inserted and about which the arm may rotate. The pivot pin is attached to an engine or mounting surface. The main body portion comprises two leg portions that extend from the pivot point out to the chain strands.

In a first embodiment of the tensioner arm, the top end of the main body, at the end of one leg, includes a first tab. The tab extends along nearly the entire length of the top end of the leg and is bent perpendicular to the body. The tab holds a shoe which has a face which contacts an outside of a first free strand of chain. A second tab is formed on the bottom or second end of the body in a similar manner to the first tab. A second shoe is disposed on the bottom or second tab opposite the top or first shoe. The second shoe has a face which contacts an outside of a second strand of chain.

The actuator in this embodiment is a spring biased plunger which acts upon an outside surface of the tensioner arm, i.e., one of the tabs on the body, to impart a rotational force upon the arm and tension both strands of the chain simultaneously. Actuation of the plunger against one tab causes rotation of the entire arm or body about the pivot point. The inward motion of the first tab against one strand causes tension to be applied to the strand. Similarly, the inward motion of the second strand causes tension to be applied to that strand. The actuator may be a spring biased plunger, hydraulic tensioner, mechanical tensioner or any suitable mechanism which is capable of providing sufficient force and travel to act on the tensioner arm and provide an adjustment in tension of the chain.

In a second embodiment of the present invention, the tensioner arm is also located within the span of chain between two sprockets or on the inside of the two chain strands. The tensioner arm includes a main body portion which is essentially "I" shaped. A first end or upper end of the body is near the camshaft sprocket and a second end or lower end is near the crank sprocket. The main body portion includes a pair of nearly parallel sides formed along each of the two legs. A first side is adjacent the slack side of the chain and a second side is adjacent the tight side of the chain.

The main body portion of the tensioner arm includes a pair of tabs at the first or upper end of the main body portion along one leg and a pair of tabs at the second or lower end of the main body portion along the second leg. Each tab carries a shoe. Both shoes on the first or left side of the body are oriented about the slack strand of the chain. The upper left shoe is located outside the slack strand of the chain near the camshaft. The lower left shoe is located inside the slack strand of the chain near the crankshaft. The upper right shoe is located inside the tight strand of the chain near the camshaft. The lower right shoe is located outside the tight strand of the chain near the crankshaft.

In this way, a left shoe on the first end of the body contacts the outside of the slack strand of chain and a right shoe on the same end of the body contacts the inside of the tight strand near the camshaft sprocket. Similarly, a left shoe on the second or lower end of the body contacts the inside of the slack strand of chain and a right shoe on the same end of the body contacts the outside of the tight strand near the crankshaft sprocket. In other words, each strand of the chain has a pair of shoes, one shoe at one end of the body contacting the outside of the strand and the other shoe at the other end of the body contacting the inside of the strand.

In operation, the piston or plunger of the tensioner, which may be hydraulically actuated, directs a force to an outside shoe or main body portion which causes the tensioner arm to pivot. Rotation of the arm causes each chain strand to be tensioned in a similar manner. Rotation of the tensioner arm causes the upper and lower shoe on the left side to contact the slack chain strand and the upper and lower right shoes to contact the tight chain strand.

In particular, the upper left shoe imparts tension to the slack chain strand by displacing the slack chain strand path toward the chain centerline. The lower left shoe imparts tension to the slack chain strand by displacing the slack chain strand path away from the chain centerline. The same direction of rotation of the arm causes the upper right shoe to impart tension to the tight chain strand by displacing the tight chain strand path away from the chain centerline. The lower right shoe imparts tension to the tight chain strand by displacing the tight chain strand path toward the chain centerline.

For a further understanding of the present invention and the objects thereof, attention is directed to the drawing and the following brief description thereof, to the detailed description of the preferred embodiment of the invention and to the appended claims.

DETAILED DESCRIPTION OF THE PREFERRED EMBODIMENTS

Figure 1:
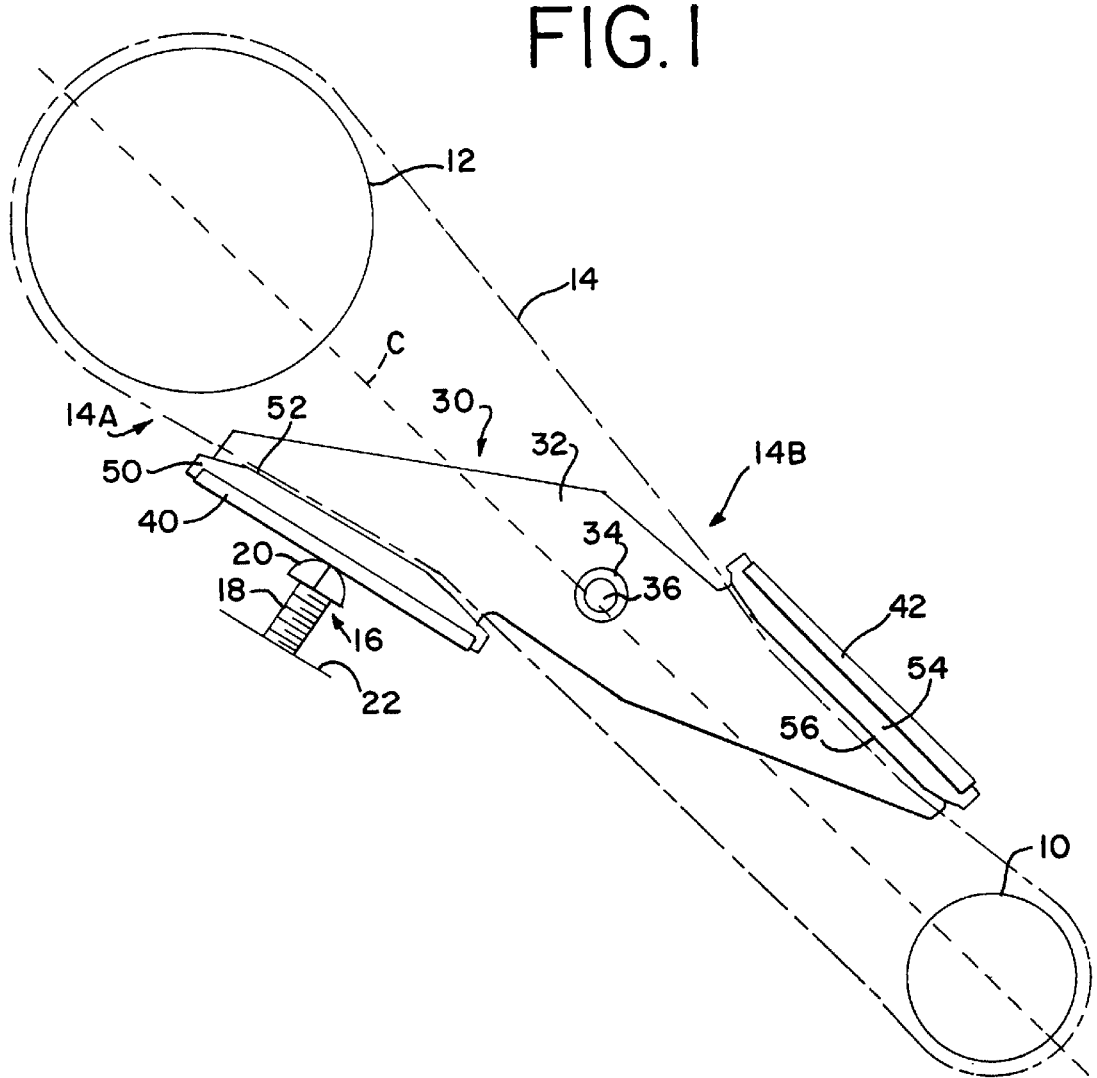
FIG. 1 is a front view of a first embodiment of the present invention.

Turning now to the drawings, FIG. 1 shows a front view of a preferred embodiment of the present invention. In this figure, an engine timing system is represented generally by crankshaft sprocket 10 (the drive sprocket) and camshaft sprocket 12 (the driven sprocket). The path of a power transmission chain, i.e., a silent chain, roller chain or the like, is represented by broken chain line 14. The tensioner system of the present invention is located between the tight and loose strands of the chain and between the two sprockets.

The tensioner system includes an actuator 16 which may be a hydraulic tensioner or the like. In the present illustration, the actuator 16 is represented by a spring element 18 and a plunger element 20. The spring element 18, one end of which is set against an engine or mounting surface 22 biases the plunger 20 in a direction away from the mounting surface and toward the chain 14.

The tensioner arm 30 includes a main body 32, which has a generally flat elongated shape. The body 32 is located between the sprockets 10, 12. In the center of the body 32 a pivot bore 34 is formed to accept a pivot pin 36. The pivot pin 36 is fixed in place such that the body 32 may rotate about the pin 36. The main body 32 has one or more tabs, such as tab 40 formed at the end of a first leg and perpendicular to the main body. The tab 40 is located adjacent the outside of a first strand 14A of the chain 14. The tab extends along nearly the full length of the upper half of the main body. The tab 40 carries a tensioner shoe 50 which has a wear face 52 which contacts the outside portion of the chain strand 14A.

The body 32 includes a second tab 42 which extends along nearly the full length of the lower half of the body. The second tab 42 is bent or formed at the end of a second leg and perpendicular to the main body 32. The second tab 42 is positioned adjacent the outside of a second strand 14B of chain 14. The second tab 42 has a shoe 54 affixed thereto which has a wear face 56 which contacts the outside of the second chain strand 14B.

In operation, when the actuator presses against the first tab and causes rotation of the arm about the pivot pin 36, the wear faces of the two shoes are each brought into contact with outside portions of the chain. As the shoes are rotated into a position closer to the centerline C between the sprockets, the chain is essentially squeezed or tightened from both sides or along both spans, simultaneously. In this manner, the tensioner arm of the present invention will potentially provide twice the take up distance of wear in a chain when compared to a conventional tensioner arm acting upon only one span, for the same amount of actuator movement upon the arm. Additionally, vibration in a first strand of chain, whether it be the loose or tight strand is transferred and damped by action of the second strand of chain due to the coupling of the two shoes through the tensioner arm body.

Figure 2:
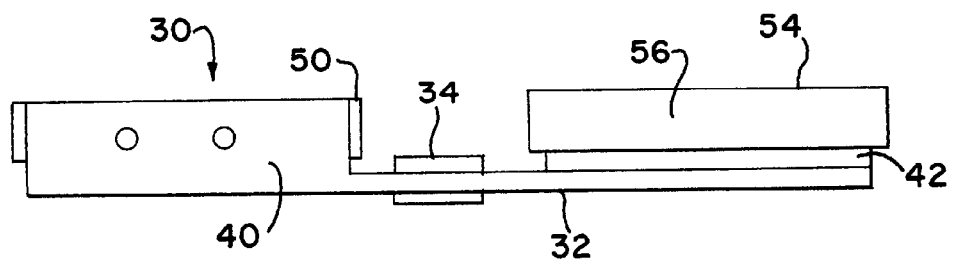
FIG. 2 is a top view of the tensioner arm of FIG. 1.

FIG. 2 depicts the tensioner arm 30 of FIG. 1 in a top view. First and second tabs 40, 42 are formed at right angles to the body 32 and on opposite ends. The tabs carry first and second shoes 50, 54 attached thereto. A pivot bushing 34 is located in the center of the tensioner body 32 and fits around a pivot pin.

Figure 3:
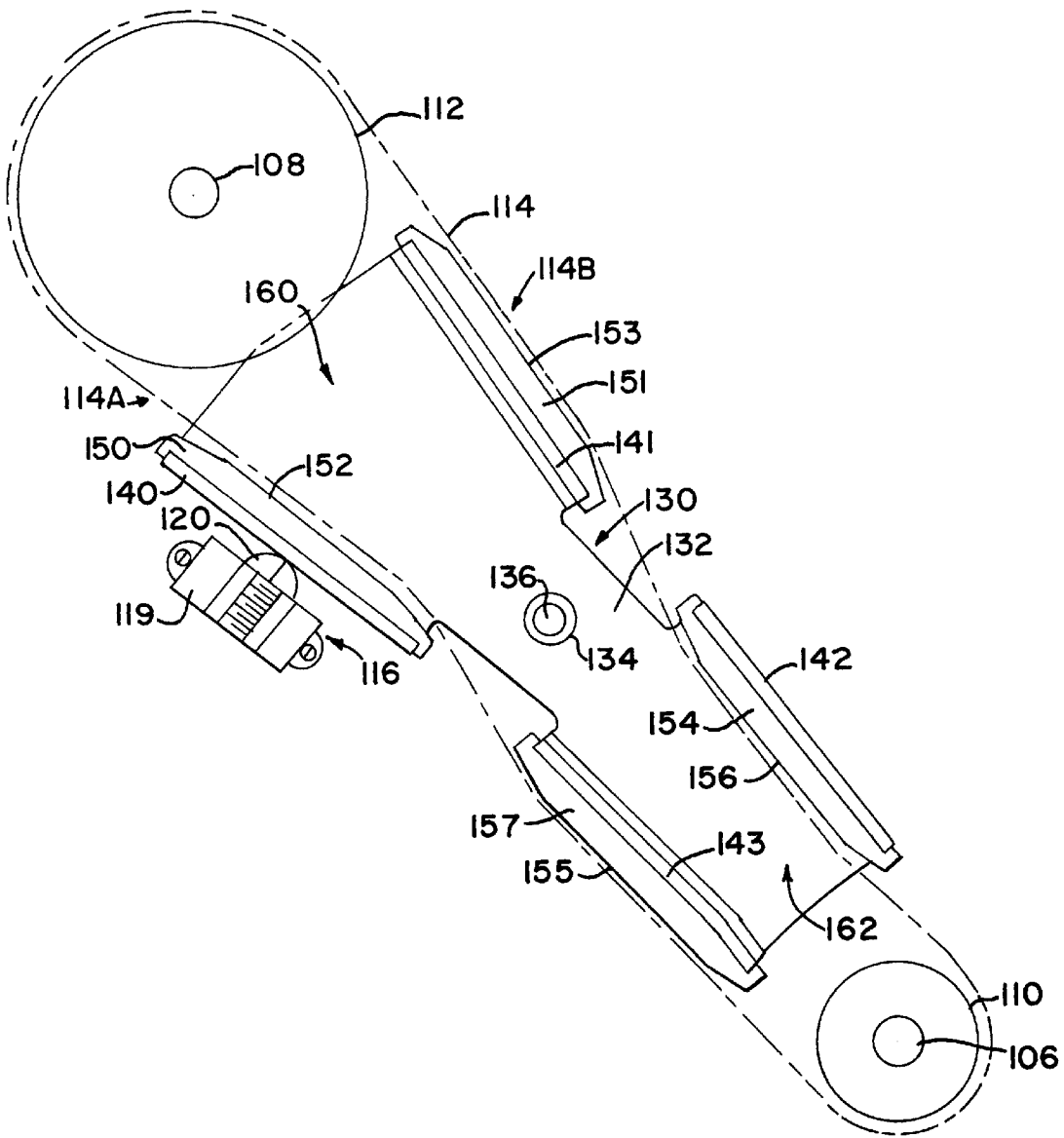
FIG. 3 is a front view of a second embodiment of the present invention with the plunger in a retracted position.
Figure 4:
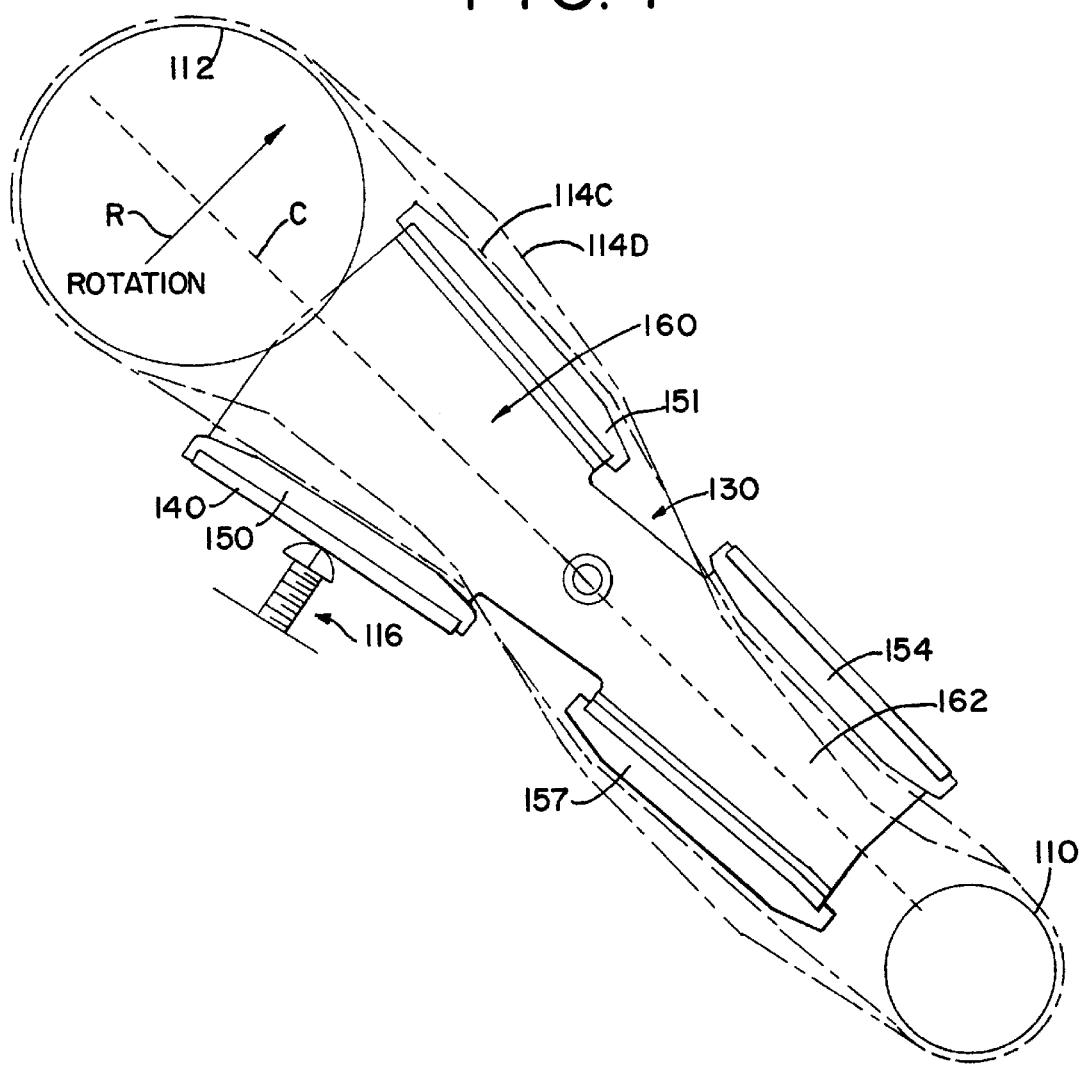
FIG. 4 is a front view of the embodiment of FIG. 3 showing the paths of new and worn chain with the plunger in an extended position.

FIGS. 3 and 4 depict a second preferred embodiment of the present invention. The timing system is shown with generalized depictions of a crankshaft 106 with an attached crank sprocket 110. A camshaft sprocket 112 is mounted to a camshaft 108. A power transmission chain 114 wraps around the crank sprocket 110 and the camshaft sprocket 112 and drivingly engages the two sprockets. In FIGS. 3 and 4, the actuator 116 depicted is a conventional hydraulic tensioner having a housing 119 and a protruding plunger 120. It should be understood that the present chain tensioner system would be useful in a balance shaft drive system as well as camshaft drive systems with multiple camshafts and sprockets.

The tensioner arm 130 is located between the crankshaft 106 and the camshaft 108 and is aligned generally with a centerline C (see FIG. 4) drawn between the centers of the shafts before the arm has been rotated. The body 132 of the tensioner arm 130 has a center pivot bore 134. A pivot pin 136 is disposed in the pivot bore 134 to allow rotation of the arm about the pin 136.

For ease of description, the arrangement of parts described in the following will be set forth according to the orientation of those parts as shown in the figures. It will be understood that alternate orientations exist which are contemplated by the present invention which would alter the orientation of the parts, i.e., change "left" to "right", and so on, but not the spirit of the invention.

The first end of the body at an upper portion, i.e., the upper leg 160, which is the portion of the body nearer the camshaft sprocket 112, has a pair of tabs 140, 141 formed thereon. An upper left tab 140 is located outside the slack strand 114A of chain 114. The tab 140 carries a shoe 150 with a wear face 152 positioned to contact the outside of the slack strand 114A. The upper right tab 141 is located inside the tight strand 114B of chain 114. The tab 141 carries a shoe 151 with a wear face 153 positioned to contact the inside of the tight strand 114B.

A second end of the body at a lower portion, i.e., the lower leg 162, which is the portion of the body nearer the crank sprocket 110, has a pair of tabs 143, 142 formed thereon. A lower left tab 143 is located inside the slack strand 114A of the chain 114. The tab carries a shoe 157 with a wear face 155 positioned to contact the inside of the slack strand 114A. A lower right tab 142 is located outside the tight strand 114B of the chain 114. The tab 142 carries a shoe 154 with a wear face 156 positioned to contact the outside of the tight strand 114B. All four tabs and the shoes fixed thereto are formed or oriented essentially perpendicular to the main portion of the body 132.

The chain 114 may be wrapped around two sprockets 110, 112 which differ in their diameters causing the chain strands 114A, 114B to be relatively far apart when wrapped around a larger diameter sprocket. The width of each leg 160, 162 is adapted to the relative widths between the chain strands. In other words, the width of the leg and the corresponding space between the left and right shoes at one end of the body should be greater where the distance between the chain strands is greater. This allows the tensioner arm to load the chain approximately equally at the upper and lower portions of the chain strands.

In operation, as shown in FIG. 4, the actuator 116 produces a force on the outside of the upper left tab 140. The resultant rotation R of the tensioner arm 130 is clockwise in this example. The upper shoes 150, 151 would apply a force to the strands 114A, 114B of chain in the portions near the camshaft 180 in the direction of arrow R. The lower shoes 154, 157 would apply a force to the strands of chain in the portions near the crankshaft 106 opposite the direction of arrow R. However, it should be understood that a reverse orientation of the tensioner shoes and actuator would produce a rotation in the counter clockwise direction which would provide an equivalent tensioning result to a chain.

FIG. 4 also depicts the chain path and suggests the motion of the tensioner arm 130 as a result of chain wear over time. The path of a new chain 114C is shorter between the sprockets and the path of a worn, elongated chain 114D is shown as the longer path.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A power transmission chain and tensioner system for an automotive engine application, said chain tensioner and power transmission chain system comprising:

a plurality of sprockets including at least one driving sprocket connected to a power input and at least one driven sprocket connected to a power output;

a chain assembled of interleaved links, said chain wrapped around said plurality of sprockets, said chain including at least one tight strand portion having some of said links being pulled by said driving sprocket and at least one slack strand portion on the opposite side of the chain;

a pivot pin attached to said engine;

a tensioner arm including a main body portion located between said tight strand and said slack strand, said main body portion having a first leg, a second leg opposite said first leg and a pivot bore located between said first leg and said second leg, said pivot bore of said arm being disposed on said pivot pin to permit rotation of said arm about said pin;

a first shoe disposed on said first leg, said first shoe extending outside said slack strand of said chain, said slack strand of said chain running along the length of said first shoe;

a second shoe disposed on said second leg, said second shoe extending outside said tight strand of said chain, said tight strand of said chain running along the length of said second shoe;

an actuator, said actuator acting upon an outside surface of one leg of said tensioner arm to cause said tensioner arm to rotate about said pivot pin, said rotation of said tensioner arm causing said first and second shoes to move laterally to tension said chain.

2. The power transmission chain and tensioner system of claim 1 wherein said main body portion has an elongated shape with said first leg adjacent said driven sprocket and said second leg adjacent said driving sprocket.

3. The power transmission chain and tensioner system of claim 2 wherein said first shoe and said second shoe extend outwardly from said first and second legs in a direction perpendicular from said main body portion.

4. The power transmission chain and tensioner system of claim 2 further comprising:
   a third shoe disposed on said first leg, said third shoe extending inside said tight strand of said chain, said tight strand of said chain running along the length of said third shoe; and
   a fourth shoe disposed on said second leg, said fourth shoe extending inside said slack strand of said chain, said slack strand of said chain running along the length of said fourth shoe.

5. The power transmission chain and tensioner system of claim 4 wherein said driving sprocket has a greater diameter than said driven sprocket, said slack and said tight strands of chain being separated by a first longitudinal distance near said driving sprocket, said slack and tight strands separated by a second longitudinal distance near said driven sprocket, said first distance being greater than said second distance;
   said first and said third shoes being separated by a third distance and said second and fourth shoes being separated by a fourth distance, said third distance being greater than said fourth distance to accommodate said first distance being greater than said second distance between said strands of chain.

* * * * *